(12) United States Patent
Tokyo et al.

(10) Patent No.: US 12,436,631 B2
(45) Date of Patent: Oct. 7, 2025

(54) INFORMATION PROCESSING APPARATUS, BATTERY LEVEL NOTIFICATION METHOD, AND PROGRAM THEREFOR

(71) Applicant: Lenovo (Singapore) Pte. Ltd., Singapore (SG)

(72) Inventors: Asahi Tokyo, Kanagawa (JP); Kiyoshi Nakagawa, Kanagawa (JP); Junki Sato, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/788,791

(22) Filed: Jul. 30, 2024

(65) Prior Publication Data

US 2025/0077004 A1 Mar. 6, 2025

(30) Foreign Application Priority Data

Aug. 28, 2023 (JP) ................................. 2023-138154

(51) Int. Cl.
*G06F 3/038* (2013.01)

(52) U.S. Cl.
CPC .................... *G06F 3/038* (2013.01)

(58) Field of Classification Search
CPC .... G06F 3/038; G06F 1/3212; G06F 3/03545; G06F 3/04817; G06F 1/28
See application file for complete search history.

(56) References Cited

U.S. PATENT DOCUMENTS

| 2014/0068314 | A1* | 3/2014 | Kim | G06F 1/28 |
| | | | | 713/340 |
| 2018/0123358 | A1 | 5/2018 | Prabhakar et al. | |
| 2018/0173330 | A1* | 6/2018 | Lee | G06F 3/04162 |
| 2020/0033962 | A1 | 1/2020 | Moon et al. | |
| 2020/0042107 | A1 | 2/2020 | Kwon et al. | |

FOREIGN PATENT DOCUMENTS

| JP | H07-182090 A | 7/1995 |
| JP | 2002-62975 A | 2/2002 |
| JP | 2009-207281 A | 9/2009 |

OTHER PUBLICATIONS

Extended European Search Report issued in corresponding European Patent Application No. 24190002.6, dated Jan. 9, 2025 (8 pages).

* cited by examiner

*Primary Examiner* — Jonathan A Boyd
(74) *Attorney, Agent, or Firm* — Osha Bergman Watanabe & Burton LLP (57) ABSTRACT

An information processing apparatus includes: a usage level setting section that sets a usage level indicating a usage status of a pen-type input device using multiple usage status information in which a battery voltage level notified of by the pen-type input device is associated with time information; a remaining time acquisition section that acquires remaining time corresponding to the current battery voltage level by using conversion information corresponding to the set usage level among conversion information in which the battery voltage level is associated with remaining time for each usage level; and a notification section that gives notice of the acquired remaining time.

9 Claims, 5 Drawing Sheets

| BATTERY VOLTAGE LEVEL | REFERENCE ELAPSED TIME |
|---|---|
| 5 | Tref_5 |
| 4 | Tref_4 |
| 3 | Tref_3 |
| 2 | Tref_2 |
| 1 | Tref_1 |

FIG. 5

| BATTERY VOLTAGE LEVEL | REMAINING TIME | | |
|---|---|---|---|
| | LIGHT | NORMAL | HEAVY |
| 5 | Ta5 | Tb5 | Tc5 |
| 4 | Ta4 | Tb4 | Tc4 |
| 3 | Ta3 | Tb3 | Tc3 |
| 2 | Ta2 | Tb2 | Tc2 |
| 1 | Ta1 | Tb1 | Tc1 |

INFORMATION PROCESSING APPARATUS, BATTERY LEVEL NOTIFICATION METHOD, AND PROGRAM THEREFOR

CROSS-REFERENCE TO RELATED APPLICATIONS

This application claims priority to Japanese Patent Application No. 2023-138154 filed on Aug. 28, 2023, the contents of which are hereby incorporated herein by reference in their entirety.

TECHNICAL FIELD

This disclosure relates to an information processing apparatus, a battery level notification method, and a program therefor.

BACKGROUND

Conventionally, a pen-type input device is sometimes used as an input device in an information processing apparatus such as a laptop PC, a tablet terminal, and a smartphone.

For example, when a pen-type input device is connected to an information processing apparatus via Bluetooth (registered trademark), it is possible to acquire relatively detailed battery level information (for example, 100 levels of battery level information) from the pen-type input device. Therefore, displaying the battery level information, which is acquired from the pen-type input device, on the display enables the user to be notified of an almost accurate battery level of the pen-type input device.

When a pen-type input device is equipped with a Bluetooth (registered trademark) communication function, the size of the device becomes larger and the cost increases, and therefore there are many pen-type input devices without this type of communication function.

In those cases, the battery level information provided by the pen-type input device is extremely coarse compared to the Bluetooth (registered trademark) case (for example, three to five levels of battery level information). Therefore, it is difficult to inform the user of the detailed battery level. Furthermore, the frequency and duration of use of pen-type input devices vary greatly from user to user. Therefore, even if the same battery level notification (for example, remaining battery level "3") is given, the remaining time such as, for example, how long the pen-type input device can be used for, greatly varies depending on the usage status of the pen-type input device.

SUMMARY

An object of this disclosure is to provide an information processing apparatus, a battery level notification method, and a program that enable an improvement in the user experience of battery level notification in a pen-type input device not equipped with Bluetooth (registered trademark).

An information processing apparatus according to one or more embodiments includes: a usage level setting section that sets a usage level indicating a usage status of a pen-type input device using multiple usage status information in which a battery voltage level notified of by the pen-type input device is associated with time information; a remaining time acquisition section that acquires remaining time corresponding to the current battery voltage level by using conversion information corresponding to the set usage level among conversion information in which the battery voltage level is associated with remaining time for each usage level; and a notification section that gives notice of the acquired remaining time.

According to one or more embodiments of the present disclosure, there is provided an information processing apparatus including: a processor; and a memory that stores a program that, when executed by the processor, causes the processor to perform a function, wherein the function includes: setting a usage level indicating a usage status of a pen-type input device using multiple usage status information in which a battery voltage level notified of by the pen-type input device is associated with time information; acquiring remaining time corresponding to the current battery voltage level by using conversion information corresponding to the set usage level among conversion information in which the battery voltage level is associated with remaining time for each usage level; and giving notice of the acquired remaining time.

According to one or more embodiments of the present disclosure, there is provided a battery level notification method wherein a computer performs: a usage level setting process of setting a usage level indicating a usage status of a pen-type input device using multiple usage status information in which a battery voltage level notified of by the pen-type input device is associated with time information; a remaining time acquisition process of acquiring remaining time corresponding to the current battery voltage level by using conversion information corresponding to the set usage level among conversion information in which the battery voltage level is associated with remaining time for each usage level; and a notification process of giving notice of the acquired remaining time.

According to one or more embodiments of the present disclosure, there is provided a program for causing a computer to function as the above information processing apparatus.

One or more embodiments of the present disclosure can improve the user experience of battery level notification in a pen-type input device not equipped with Bluetooth (registered trademark).

DETAILED DESCRIPTION

An information processing apparatus, a battery level notification method, and a program therefor according to one or more embodiments of the present disclosure are described below with reference to drawings. As an example of an information processing apparatus 1, a laptop PC is illustrated and described below, but the information processing apparatus 1 according to these embodiments is not limited thereto. For example, the information processing apparatus 1 may be a tablet terminal, a smartphone, a personal digital assistance (PDA), and so on, and may be widely applied to an information processing apparatus that supports pen-type input devices.

Figure 1:
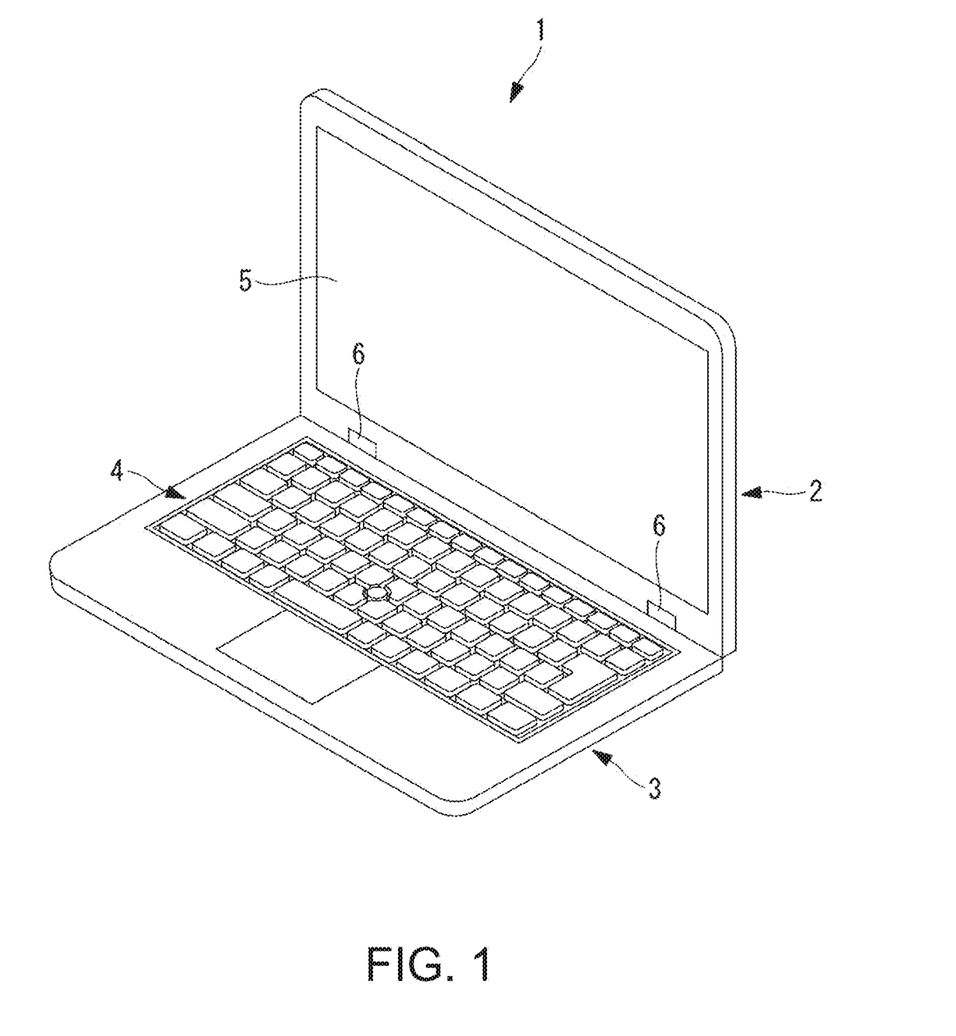
FIG. 1 is a schematic external view of an information processing apparatus according to one or more embodiments of the present disclosure.

FIG. 1 is a schematic external view of the information processing apparatus 1 according to one or more embodiments of the present disclosure. As illustrated in FIG. 1, the information processing apparatus 1 has a first chassis 2 and a second chassis 3. The first chassis 2 and the second chassis 3 are connected to each other by connecting members 6 that allow the first chassis 2 and the second chassis 3 to be opened and closed relatively. An example of the connecting member 6 is a hinge.

The first chassis 2 is substantially rectangular and has a touch panel display 5 provided on a surface opposite to the second chassis 3. The touch panel display 5, for example, is formed of a display 5a (see FIG. 2) on which a touch panel 5b (see FIG. 2) is superimposed. The touch panel 5b detects various operations performed by using a finger or a pen-type input device 30 (see FIG. 2). An example of the pen-type input device 30 is a stylus pen (touch pen). The structure of the touch panel display 5 may be made using any known technique, and a detailed description is omitted here.

The second chassis 3 is substantially rectangular in shape, and an input device 4 is provided on the first side of the second chassis 3. The input device 4 is a user interface for a user to perform input operations. Examples of the input device 4 are a keyboard, a touchpad, a TrackPoint, and so on.

Figure 2:
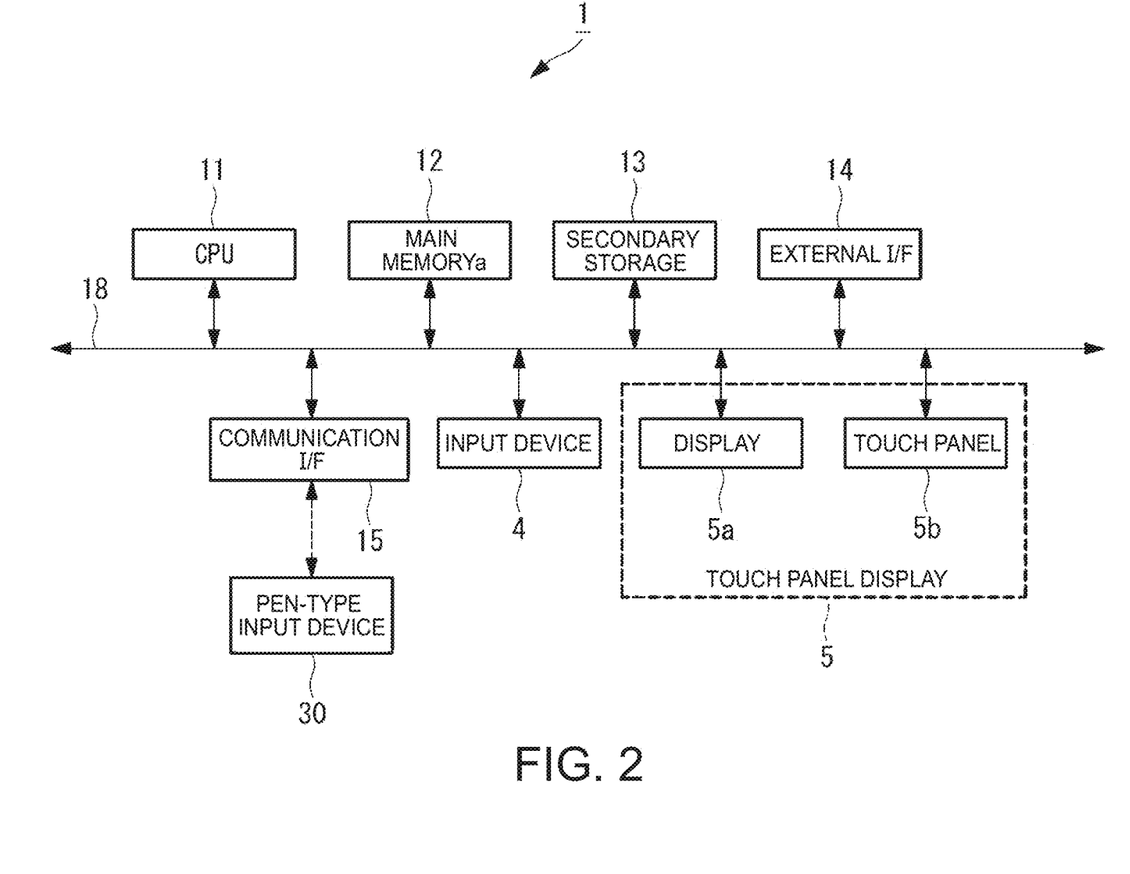
FIG. 2 is a schematic configuration diagram illustrating an example of a hardware configuration of an information processing apparatus according to one or more embodiments of the present disclosure.

Subsequently, the hardware configuration of the information processing apparatus 1 according to one or more embodiments is described with reference to FIG. 2. FIG. 2 is a schematic configuration diagram illustrating an example of a hardware configuration of the information processing apparatus 1 according to one or more embodiments. As illustrated in FIG. 2, the information processing apparatus 1 includes, for example, a central processing unit (CPU: processor) 11, a main memory 12, a secondary storage (memory) 13, an external interface 14, a communication interface 15, and so on, in addition to the input device 4 and the touch panel display 5 described above. These parts are connected to each other directly or indirectly via a bus 18, and perform various processes in cooperation with each other.

The CPU 11, for example, controls the entire information processing apparatus 1 by means of an operating system (OS) stored in the secondary storage 13 connected via the bus 18, and executes various programs stored in the secondary storage 13 to perform various processes. One or more CPUs 11 are provided, and may cooperate with each other to implement processing.

The main memory 12 is composed of a cache memory and a random access memory (RAN) or any other writable memory, and is used as a work area for reading a program executed by the CPU 11, writing processing data by the executed program, and the like.

The secondary storage 13 is a non-transitory computer readable storage medium. The secondary storage 13 is, for example, a magnetic disk, an optical disk, a CD-ROM, a DVD-ROM, or a semiconductor memory. Examples of the secondary storage 13 are a read only memory (ROM), a hard disk drive (HDD), and a solid state drive (SDD) flash memory. The secondary storage 13 stores, for example, an OS for controlling the entire information processing apparatus such as Windows (registered trademark), iOS (registered trademark), and Android (registered trademark), BIOS (basic input/output system), various device drivers for hardware operation of peripherals, various application software, and various data and files. In addition, the secondary storage 13 stores programs for implementing various processes and various data required to implement various processes. The secondary storage 13 may be plural, and the respective secondary storages 13 may store the programs and data described above in a divided manner.

The external interface 14 is an interface for connecting to external devices. Examples of the external devices include an external monitor, a USB memory, an external HDD, an external camera, and so on. In the example in FIG. 2, only one external interface is illustrated, but a plurality of external interfaces may be provided.

The communication interface 15 functions as an interface to connect to a network and communicate with other devices to send and receive information. For example, the communication interface 15 communicates with other devices by wired or wireless communication. The wireless communication includes communication through lines such as Bluetooth (registered trademark), Wi-Fi, mobile communication systems (3G, 4G, 5G, 6G, LTE, and the like), and wireless LANs. An example of the wired communication is a communication through a network such as a wired LAN (local area network) or the like.

In one or more embodiments, the pen-type input device 30 is connected via the communication interface 15. The details are described later.

Figure 3:
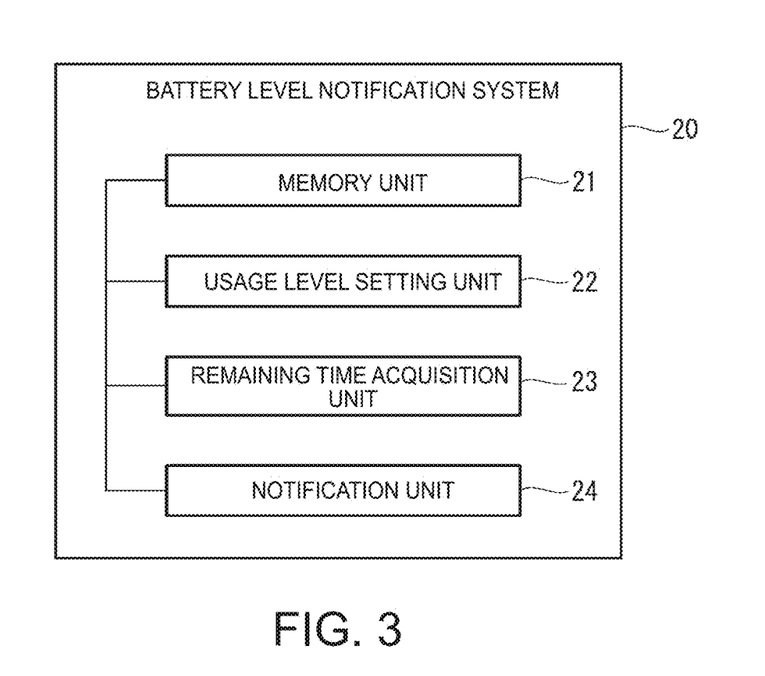
FIG. 3 is a functional configuration diagram illustrating an example of functions of an information processing apparatus according to one or more embodiments of the present disclosure.

FIG. 3 is a functional configuration diagram illustrating an example of functions of the information processing apparatus 1. As illustrated in FIG. 3, the information processing apparatus 1 includes a battery level notification system 20. The battery level notification system 20 includes, for example, a memory unit 21, a usage level setting unit 22, a remaining time acquisition unit 23, and a notification unit 24.

The functions implemented by these respective parts are implemented by the CPU (processor) 11 reading, for example, the program (battery level notification program) stored in the secondary storage 13 into the main memory 12 and performing information processing and arithmetic operations. The program may be provided in the form of being pre-installed in the secondary storage 13, being stored in a non-transitory computer readable storage medium, or being distributed via wired or wireless communication means. Examples of the non-transitory computer readable storage medium include a magnetic disk, an optical disk, a CD-ROM, a DVD-ROM, a semiconductor memory, and the like.

The memory unit 21 stores, for example, multiple usage status information in which a battery voltage level is associated with time information, the battery voltage level being notified of by the pen-type input device 30 with which communication has been established. For example, when there is the pen-type input device 30 with which communication has been established, at the time of occurrence of an event such as a touch to the touch panel 5b, the battery voltage level is sent as a notification from the pen-type input device 30 to the information processing apparatus 1 (specifically, a touch IC or the like that controls the touch panel 5b). This notification is performed by using, for example, the human interface device (HID) protocol.

Figure 4:
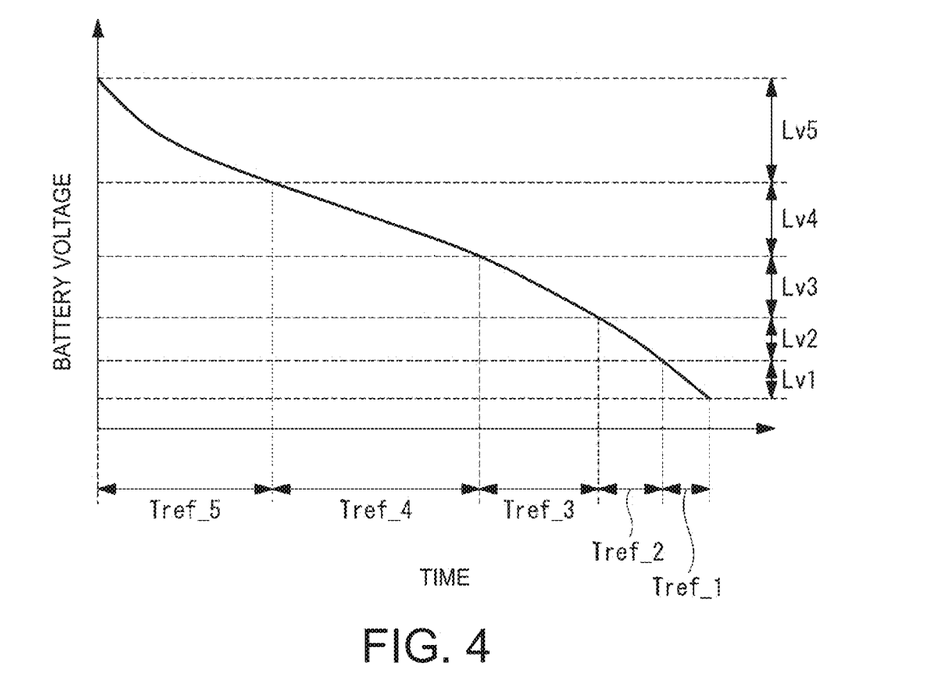
FIG. 4 is a diagram for describing battery voltage levels and reference elapsed time according to one or more embodiments of the present disclosure.

In the above, the battery voltage level is, for example, information of the battery voltage of the pen-type input device 30 divided into a plurality of levels, as illustrated in FIG. 4. In one or more embodiments, as illustrated in FIG. 4, the case in which the battery voltage level is represented by any of five levels (Lv1 to Lv5) is illustrated as an example for description.

The usage level setting unit 22 sets the usage level indicating the usage status of the pen-type input device 30 using multiple usage status information stored in the memory unit 21.

The usage level is a classification of the usage status of the pen-type input device 30 by the user into multiple levels. For the sake of convenience, the case where the usage status is classified into three levels (LIGHT, NORMAL, and HEAVY) as an example for description, but the number of levels for the classification is not particularly limited. For example, the usage status may be divided into two levels, or into three or more levels.

When the pen-type input device 30 notifies the usage level setting unit 22 of a battery voltage level, for example, the usage level setting unit 22 determines whether the battery voltage level (the latest battery voltage level) is different from the last-notified battery voltage level. In the case of determining that the battery voltage level is different, the usage level setting unit 22 sets the usage level. Specifically, the usage level setting unit 22 calculates the elapsed time until the battery voltage level is changed based on the multiple usage status information stored in the memory unit 21 in the case where the battery voltage level is changed, and then sets the usage level using the calculated elapsed time.

Figure 5:
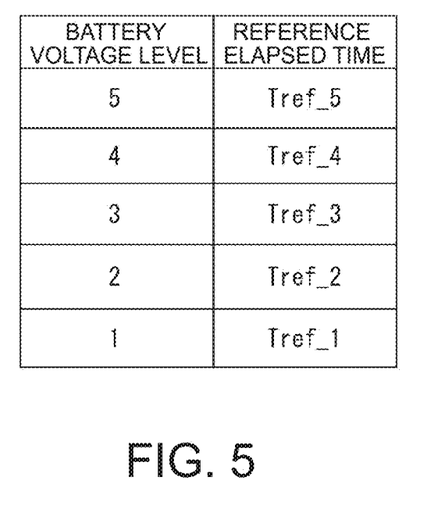
FIG. 5 is a diagram illustrating an example of usage level determination information according to one or more embodiments of the present disclosure.

For example, as illustrated in FIG. 5, the usage level setting unit 22 has usage level determination information (usage level determination condition) in which the battery voltage level is associated with the reference elapsed time. The usage level is set by comparing the reference elapsed time with the elapsed time calculated based on the usage status information. The reference elapsed time is, for example, as illustrated in FIG. 4, information that is previously set based on the elapsed time until the battery voltage level changes in the reference battery voltage curve (in one or more embodiments, the battery voltage curve of the usage level "NORMAL"). In FIG. 4, the horizontal axis represents time and the vertical axis represents battery voltage.

For example, now consider the case where the battery voltage level is changed from "5" to "4." In this case, the usage level setting unit 22 calculates the elapsed time T as a period during which the battery voltage level is recorded as "5" from the usage status information stored in the memory unit 21. For example, the more the user is casual, the longer the elapsed time T is. Then, the usage level setting unit 22 acquires the reference elapsed time Tref_5 associated with the battery voltage level "5" from the usage level determination information (see FIG. 4) to compare the acquired reference elapsed time Tref_5 with the elapsed time T.

In the case where the elapsed time T is shorter than the reference elapsed time Tref_5 as a result, the usage level is set to "HEAVY." In the case where the elapsed time T is longer than the reference elapsed time Tref_5, the usage level is set to "LIGHT." In the case where the elapsed time T is equal to the reference elapsed time Tref_5, the usage level is set to "NORMAL." Note that the reference elapsed time may be set as a range with upper and lower limits, instead of a single value.

The usage level setting unit 22 sets the usage level to a default such as, for example, "NORMAL," in the case where the latest battery voltage level has been changed in the direction of charging with respect to the last-acquired battery voltage level.

The remaining time acquisition unit 23 has multiple conversion information in which the battery voltage level is associated with the remaining time for each usage level. Then, among the multiple conversion information, the conversion information corresponding to the usage level set by the usage level setting unit 22 is used to acquire the remaining time corresponding to the current battery voltage level.

Figure 6:
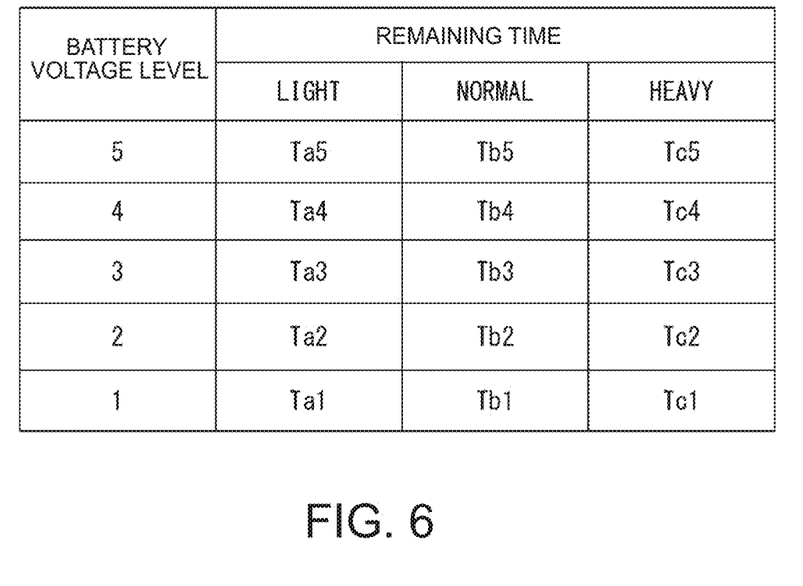
FIG. 6 is a diagram illustrating an example of conversion information according to one or more embodiments of the present disclosure.

FIG. 6 is a diagram illustrating an example of the conversion information. As illustrated in FIG. 6, the conversion information contains the remaining time registered for the battery voltage level for each of the usage levels "LIGHT," "NORMAL," and "HEAVY." In this specification, it is assumed that the remaining time for LIGHT is longer than the remaining time for NORMAL, and the remaining time for NORMAL is longer than the remaining time for HEAVY.

The notification unit 24 gives notice of the remaining time acquired by the remaining time acquisition unit 23. For example, the notification unit 24 displays an icon of the battery of the pen-type input device 30 on the display 5a and displays the remaining time in the icon. The notification method of the remaining time is not particularly limited thereto, as long as the user is notified of the remaining time.

Figure 7:
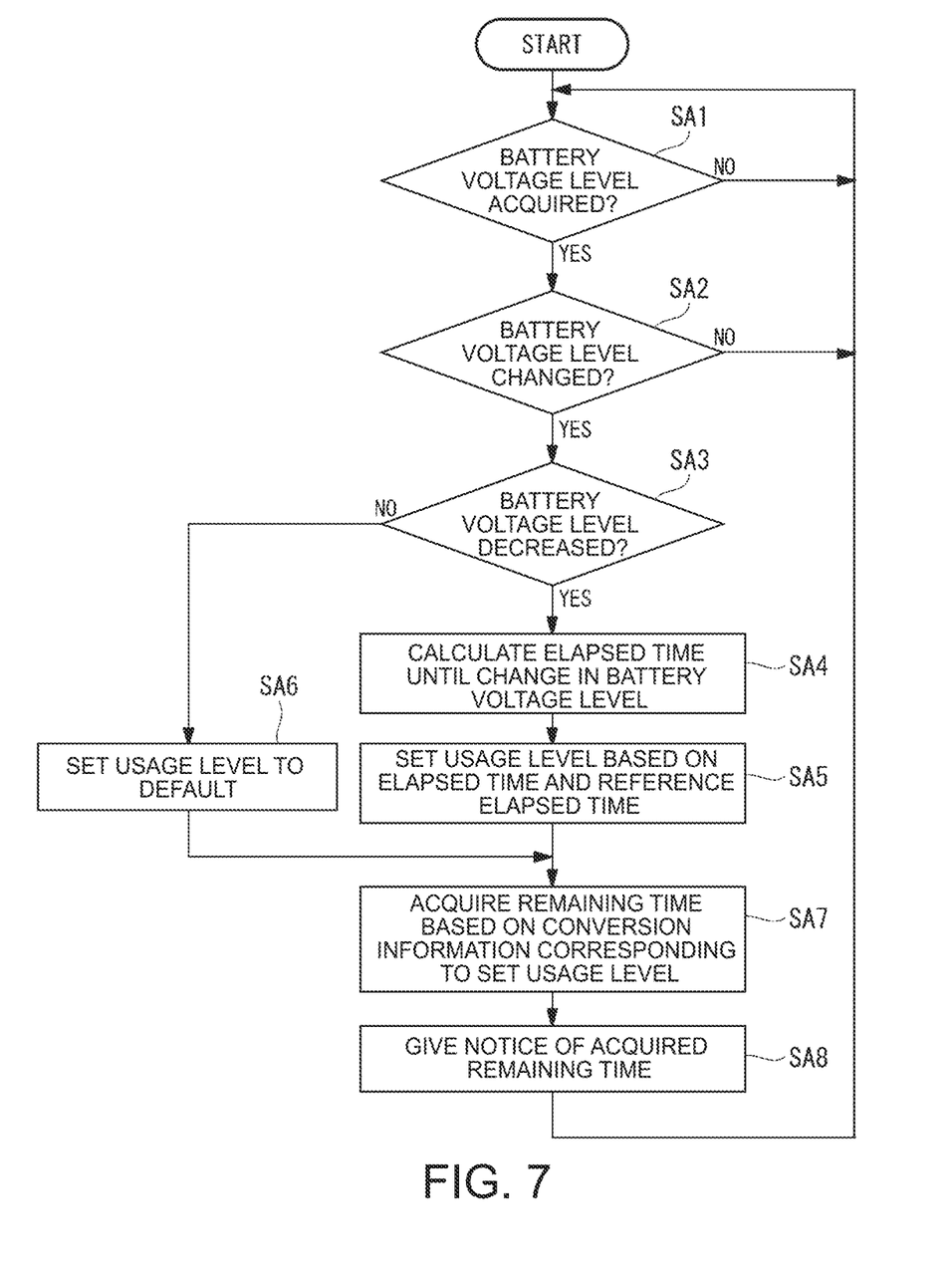
FIG. 7 is a flowchart illustrating an example of a processing procedure for battery level notification processing according to one or more embodiments of the present disclosure.

Subsequently, the battery level notification processing (battery level notification method) performed by the battery level notification system 20 of the information processing apparatus 1 is described with reference to FIG. 7. FIG. 7 is a flowchart illustrating an example of a processing procedure for the battery level notification processing according to one or more embodiments of the present disclosure. The series of processes described below are implemented, for example, by the CPU 11 reading the input control program stored in the secondary storage 13 into the main memory 12 and performing the information processing and arithmetic operations.

Input control processing is started, for example, when communication with the pen-type input device 30 is established, and is repeatedly performed until the communication with the pen-type input device 30 is terminated.

First, the battery level notification system 20 determines whether the battery voltage level is notified of by the pen-type input device 30 (SA1). In the case where the battery voltage level is not notified of (SA1: NO), the processing enters a waiting state until the battery voltage level is notified of. On the other hand, in the case where the battery voltage level is notified of (SA1: YES), the battery level notification system 20 determines whether there is a change in the battery voltage level with reference to the past usage status information stored in the memory unit 21 (SA2).

In the case where there is no change (SA2: NO) as a result, the processing returns to step SA1. On the other hand, in the case where there is a change in the battery voltage level (SA2: YES), the battery level notification system 20 determines whether the battery voltage level decreases, in other words, whether there is a change in the direction that the battery level decreases (SA3). As a result, in the case where the battery voltage level decreases (SA3: YES), the battery level notification system 20 calculates the elapsed time until the battery voltage level is changed, using the past usage status information stored in the memory unit 21 (SA4).

Subsequently, the reference elapsed time corresponding to the last battery voltage level is acquired from the usage level determination information (see FIG. 5). Then, by comparing the acquired reference elapsed time with the elapsed time calculated in step SA4, the usage level is set (SA5) and the processing proceeds to step SA7. For example, in the case where the elapsed time is longer than the reference elapsed time, "LIGHT" is set. In the case where the elapsed time is shorter than the reference elapsed time, "HEAVY" is set. In the case where the elapsed time is the same as the reference elapsed time, "NORMAL" is set. In this case, with reference to a value obtained by the reference elapsed time plus a predetermined margin (±α), "HEAVY" may be set in the case where the elapsed time is shorter than the lower limit (reference elapsed time −α), "LIGHT" may be set in the case where the elapsed time is longer than the upper limit (reference elapsed time +α), and "NORMAL" may be set in any other case.

On the other hand, when the battery voltage level increases in step SA3 (SA3: NO), a default (for example, "NORMAL") is set for the usage level (SA6), and the processing proceeds to step SA7.

In step SA7, the remaining time corresponding to the battery voltage level is acquired from the conversion information (see FIG. 6) corresponding to the set usage level (SA7). For example, in the case where the usage level is set to "HEAVY" and the received battery voltage level is "3," the remaining time "Tc3" is acquired based on the conversion information illustrated in FIG. 6.

Then, the user is notified of the acquired remaining time (SA8), and the processing returns to step SA1.

As described above, the information processing apparatus 1 according to one or more embodiments includes: a usage level setting unit 22 that sets a usage level indicating the usage status of the pen-type input device 30 using multiple usage status information in which the battery voltage level of the pen-type input device 30 is associated with time information; a remaining time acquisition unit 23 that acquires remaining time corresponding to the current battery voltage level by using conversion information corresponding to the set usage level among conversion information in which the battery voltage level is associated with remaining time for each usage level; and a notification unit 24 that gives notice of the acquired remaining time.

In this way, the remaining battery level is converted to the remaining time by using the conversion information with the user's usage status considered and the remaining time acquired by the conversion is presented to the user, by which the user is able to be notified of more accurate remaining time. This enables improvement in the user experience of battery level notification. In addition, the battery level notification method of one or more embodiments is able to be widely and universally applied to pen-type input devices 30 that are not equipped with Bluetooth (registered trademark).

Although this disclosure has been described by using the above-described embodiments, the technical scope of this disclosure is not limited to the scope described in the above-described embodiments. Various changes or improvements may be made to the above-described embodiments without departing from the gist of the disclosure, and the form in which such changes or improvements are made is also included in the technical scope of this disclosure.

The flow of the processing described in the above-described embodiments is also an example, and unnecessary steps may be deleted, new steps may be added, or the order of the processing may be changed within the scope that does not deviate from the gist of this disclosure.

For example, even at the same battery voltage level, the remaining time varies depending on the structure or characteristics of the pen-type input device 30, the battery used by the pen-type input device 30, and so on. Therefore, for example, the usage level determination information (usage level determination condition) as illustrated in FIG. 5 may be held in association with the device ID of the pen-type input device 30, and then the usage level may be set using the usage level determination information corresponding to the device ID of the pen-type input device 30.

In one or more embodiments, for explanatory convenience, description has been made on the case in which the usage level is classified into three levels: "LIGHT," "NORMAL," and "HEAVY." The usage level, however, is not limited thereto. For example, the usage level may be divided into four or more levels. In this case, more detailed determination conditions (for example, multiple reference elapsed time or the like) for performing level classification may be set in advance to enable detailed level classification.

In one or more embodiments, the reference elapsed time is used to set the usage level as illustrated in FIG. 5, but the way of setting the usage level is not limited thereto. For example, the usage level may be set not by the elapsed time until the battery voltage level is changed, but by processing the past usage status information statistically or using machine learning.

In one or more embodiments, description has been made on the case in which the battery level notification system 20 is equipped with the memory unit 21 is described, but the configuration is not limited thereto. For example, the memory unit 21 may be stored in a predetermined memory area in the information processing apparatus 1, or may be stored in an external storage accessible by the information processing apparatus 1.

DESCRIPTION OF SYMBOLS 1 information processing apparatus
2 first chassis
3 second chassis
4 input device
5 touch panel display
5a display
5b touch panel
6 connecting member
11 CPU
12 main memory
13 secondary storage
14 external interface
15 communication interface
18 bus
20 battery level notification system
21 memory unit
22 usage level setting unit
23 time acquisition unit
24 notification unit
30 pen-type input device

What is claimed is:
1. An information processing apparatus comprising:
a processor; and a memory that stores:
: a program that, when executed by the processor, causes the processor to perform a function; and
: a first table that associates predetermined battery voltage levels with reference elapsed time information, where the predetermined battery voltage levels correspond to non-overlapping voltage ranges that span an operational voltage range of a battery;
: a second table that associates the predetermined battery voltage levels with predetermined remaining time information for a plurality of predetermined usage levels at each of the predetermined battery voltage levels; and
: usage status information for a pen-type input device in which time information is associated with battery voltage levels reported from the pen-type input device;

wherein the function cause the processor to:
: receive a current battery voltage level notified by the pen-type input device, where the current battery voltage level is one of the predetermined battery voltage levels of the first table;
: set a current usage level of the pen-type input device, where the current usage level is one of the predetermined usage levels of the second table;
: acquire a remaining time from the predetermined remaining time information by referencing the current battery voltage level and the current usage level in the second table; and
: give notice of the remaining time.

2. The information processing apparatus according to claim 1, wherein,
: the processor sets the current usage level in response to determining a difference between the current battery voltage level and a last-notified battery voltage level previously notified by the pen-type input device.

3. The information processing apparatus according to claim 1, wherein
: the function causes the processor to acquire a reference elapsed time from the predetermined elapsed time information in the first table based on the current battery voltage level, and
: the processor sets the current usage level based on a comparison of the elapsed time with the referenced elapsed time.

4. The information processing apparatus according to claim 1, wherein
: the processor sets the current usage level to a default value in response to the current battery voltage level being higher than a last-notified battery voltage level previously notified by the pen-type input device.

5. The information processing apparatus according to claim 1, wherein
: the reference elapsed time information in the first table includes multiple values associated with one or more of the predetermined battery voltage levels.

6. The information processing apparatus according to claim 5, wherein:
: the reference elapsed time information in the first table includes a value associated with a device ID of the pen-type input device; and
: the processor sets the current usage level based on the value corresponding to the device ID of the pen-type input device.

7. A non-transitory computer-readable medium storing instructions for causing a computer to function as the information processing apparatus according to claim 1.

8. A battery level notification method wherein a computer performs:
: receiving a current battery voltage level notified by a pen-type input device, where the current battery voltage level is one of a plurality of predetermined battery voltage levels in a first table, where
:: the first table associates the plurality of predetermined battery voltage levels with reference elapsed time information;
: calculating an elapsed time at the current battery voltage level based on usage status information that associates time information with battery voltage levels reported from the pen-type input device;
: setting a current usage level of the pen-type input device based on the elapsed time, where
:: the current usage level is one of a plurality of predetermined usage levels in a second table, and
:: the second table associates the plurality of predetermined battery voltage levels with predetermined remaining time information for each of the plurality of predetermined usage levels at each of the plurality of predetermined battery voltage levels;
: acquiring a remaining time from the predetermined remaining time information by referencing the current battery voltage level and the current usage level in the second table; and
: giving notice of the remaining time.

9. An information processing apparatus comprising:
a processor; and
a memory that stores:
: a program that, when executed by the processor, causes the processor to perform a function; and
: a first table that associates predetermined battery voltage levels with reference elapsed time information, where the predetermined battery voltage levels correspond to non-overlapping voltage ranges that span an operational voltage range of a battery;
: a second table that associates the predetermined battery voltage levels with predetermined remaining time information for a plurality of predetermined usage levels at each of the predetermined battery voltage levels; and
: usage status information for a pen-type input device in which time information is associated with battery voltage levels reported from the pen-type input device;

wherein the function cause the processor to:
: receive a current battery voltage level notified by the pen-type input device, where the current battery voltage level is one of the predetermined battery voltage levels of the first table;
: calculate an elapsed time at the current battery voltage level based on the usage status information;
: set a current usage level of the pen-type input device based on the elapsed time, where the current usage level is one of the predetermined usage levels of the second table;
: acquire a remaining time from the predetermined remaining time information by referencing the current battery voltage level and the current usage level in the second table; and
: give notice of the remaining time.

* * * * *